United States Patent

[11] 3,586,922

[72] Inventors Larry R. Johnson
Sunnyvale;
Robert M. Whelton, Mountain View, both of, Calif.
[21] Appl. No. 874,535
[22] Filed Oct. 31, 1969
[45] Patented June 22, 1971
[73] Assignee Fairchild Camera and Instrument Corporation
Mountain View, Calif.

[54] MULTIPLE-LAYER METAL STRUCTURE AND PROCESSING
24 Claims, 14 Drawing Figs.

[52] U.S. Cl. 317/235, 29/576, 317/234
[51] Int. Cl. H01l 19/00
[50] Field of Search 317/235 N, 235 D

[56] References Cited
UNITED STATES PATENTS

| | | | |
|---|---|---|---|
| 3,229,119 | 1/1966 | Bohn et al. | 307/88.5 |
| 3,436,611 | 4/1969 | Perry | 317/234 |
| 3,440,498 | 4/1969 | Mitchell | 317/234 |
| 3,447,092 | 5/1969 | Hake | 330/24 |
| 3,462,317 | 8/1969 | Baum et al. | 136/230 |

*Primary Examiner*—James D. Kallam
*Attorneys*—Roger S. Borovoy and Alan H. MacPherson

ABSTRACT: The metal conductors used on an integrated circuit containing multiple layers of metallization, are all produced with sloped sides and rounded edges by use of a special etchant, a mixture of phosphoric, nitric and acetic acids.

INVENTORS
LARRY R. JOHNSON
ROBERT M. WHELTON

BY Alan H. MacPherson
ATTORNEY

INVENTORS
LARRY R. JOHNSON
ROBERT M. WHELTON

BY Alan H. MacPherson
ATTORNEY

MULTIPLE-LAYER METAL STRUCTURE AND PROCESSING

BACKGROUND OF THE INVENTION

1. Field of the Invention

This invention relates to multiple-layer metallization of semiconductor chips and in particular to a metallization process and structure which substantially eliminates the cracking and breaking of the metal leads due to abrupt elevation changes in the underlying support structure and metallization patterns.

2. Description of the Prior Art

Multiple layers of conductive patterns, each layer being insulated from adjacent layers by intervening dielectric layers, are commonly used to interconnect the regions of a semiconductor chip, and to connect the electrical circuit or circuits in or on the chip to external circuits. Such multiple-layer structures have always been troublesome. Yields have been low due to breaking of the conductors or due to inadvertent shorting of one conductive layer to another conductive layer through pinholes or cracks in the intermediate dielectric. Cracks in the conductors have occurred at the holes through the dielectric used for contacting adjacent metal layers, or at the transitions over underlying metal layers. Furthermore, intermetallic contacts between adjacent conductive layers have often been of poor quality. Consequently the yields of multiple-layer semiconductor devices, that is the percentages of useful devices obtained from production runs, have been notoriously low.

SUMMARY OF THE INVENTION

This invention substantially overcomes the short and open circuit problems of the prior art multiple-layer metallization structures thereby to increase the yield associated with these structures.

According to this invention, the steep sides and sharp edges on the metal conductors normally produced by etching these conductors from a deposited metal layer are completely eliminated and replaced by sloping sides and rounded edges. The term "edge" is used to mean the intersection of a side of a conductor with the top of the conductor. Consequently, overlying layers of dielectric and metal no longer change elevation abruptly when passing over underlying conductors but rather change elevation gradually and gently to pass over underlying conductors. The result is the almost complete elimination of breaks in the conductors at the crossover points in the circuit. Consequently, multiple-layer interconnective patterns overlying semiconductor chips are now possible with the result that a wide variety of design alternatives are available to the circuit designer. One immediate result of this invention is that the use of a plurality of overlying metal layers on a semiconductor die is now economically feasible because of the high yields associated with the invented process for producing the disclosed structure. Structures with as many as three layers of metal have been produced using the techniques of this invention with yields significantly improved over those of prior art processes.

Essential to the production of the sloped and rounded conductors of this invention is the development of an acid capable of controllably lifting the masking material used to define the conductive pattern on a metal layer. Typically, to produce a metal interconnection layer on a semiconductor die, a dielectric layer, often silicon dioxide if the underlying semiconductor material is of silicon, is first deposited on the die. A sheet of conductive metal is next evaporated over the dielectric layer. This metal layer is then masked with a selected material, typically KMER photoresist. The masking material is removed from that portion of the metal layer which is to be etched away, the remaining masking material defining the conductive pattern to be left on the die.

In the prior art, the etching is carried out so as to avoid the lifting of the photoresist material defining the conductive pattern. As a result, the metal conductors underlying the photoresist material had steep sides and sharply defined edges. Upon completion of the etching, the photoresist material was removed from the remaining metal conductors. Then one or more dielectric layers was deposited over the metal conductors and a second metal layer was evaporated over this intervening dielectric. Usually contact holes were provided in this intervening dielectric to allow electrical contact between the first and second metal layers. The dielectric, however, possessed sharp edges overlying the edges of the underlying metal conductors. These sharp edges introduced discontinuities in the newly evaporated second metal layer. Upon etching away of the undesired portions of the second metal layer, the remaining metal conductors often cracked and broke at the sharp discontinuities in the underlying dielectric.

According to this invention, however, the etchant used to etch away the undesired portions of each metal layer is an etchant which lifts the masking material while it etches. Consequently, the etchant, a mixture of concentrated nitric, phosphoric and acetic acids when the conductors are of aluminum or an aluminum-silicon alloy, not only etches away the exposed metal, but also etches away substantial amounts of the metal on the tops and edges of the conductors exposed by the lifting of the masking material. This substantially slopes the sides and rounds the edges of the conductors remaining upon the completion of the etching. Consequently, the overlying dielectric layer deposited after the etching has been completed and the wafer cleaned, rides over each underlying conductor by gently rising and climbing over this conductor rather than by abruptly changing its elevation. The second metal layer deposited over this dielectric consequently sees only gradual changes in elevation as it crosses over underlying conductors, rather than abrupt changes. Consequently the structural integrity of this second layer is maintained over these transition areas thereby eliminating the open circuits and microcracks commonly prevalent in the prior art multiple-layer structures.

DETAILED DESCRIPTION

Figure 1A:
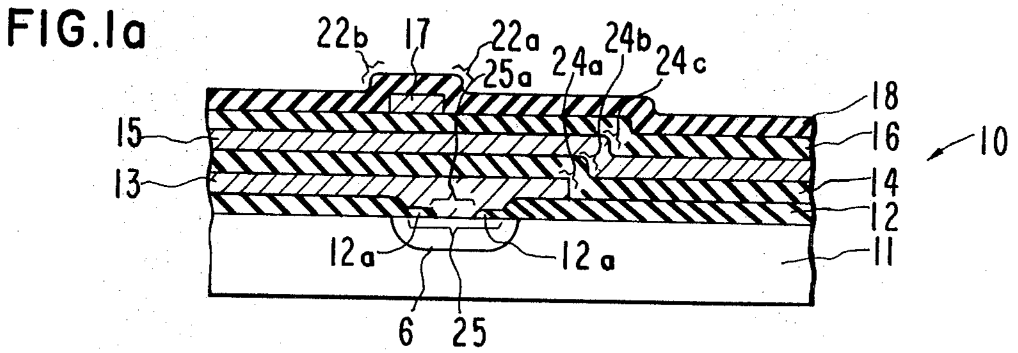
FIGS. 1*a* and 1*b* illustrate in cross section a typical prior art structure together with a typical open circuit in a conductor due to an abrupt transition in an underlying conductive pattern.
Figure 1B:
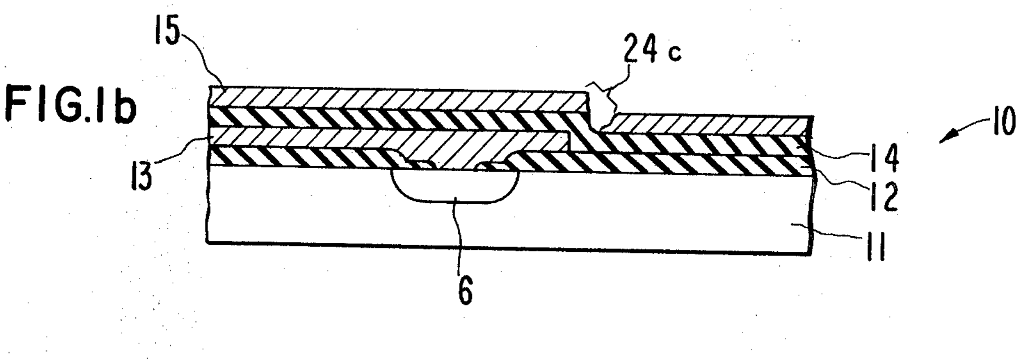
Figure 2A:
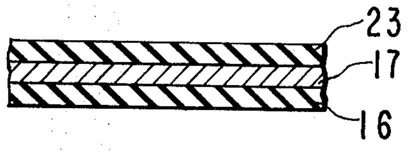
FIGS. 2*a* through 2*e* illustrate the etching process of the prior art for producing the metal conductors in one conductive layer.
Figure 2B:
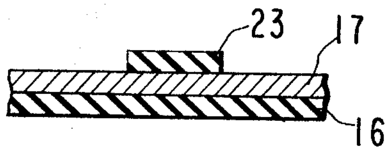
Figure 2C:
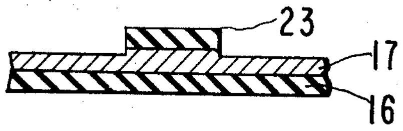
Figure 2D:
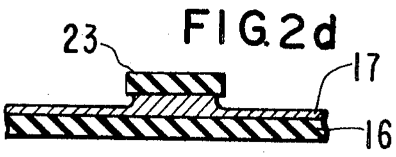
Figure 2E:
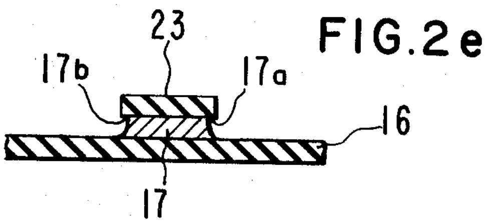

FIGS. 1*a* and 1*b* illustrate in cross section a portion of a typical multilayer structure of the prior art. A semiconductor chip 11, of one type conductivity, has diffused into it a region 6 of opposite type conductivity. Chip 11 is typically silicon, although any other semiconductor material such as germanium or gallium arsenide can be used if desired. Overlying and adherent to the top surface of chip 11 is dielectric layer 12. Typically, if chip 11 is silicon, dielectric 12 is silicon dioxide. A window 25 is cut in silicon dioxide layer 12 to define the region of chip 11 into which region 6 is diffused. The use of oxide layer 12 as a mask for the diffusion of region 6 is well known in the arts and is described in U.S. Pat. No. 3,025,589, issued Mar. 20, 1962 and assigned to Fairchild Camera and Instrument Corporation, the assignee of this invention.

A second layer **12*a* of oxide is reformed over that portion of substrate 11 exposed by window 25. A new window 25*a* is cut in this oxide. Electrical contact to the underlying diffused region 6** will be made through this window.

Conductive layer 13, which typically is aluminum but which can also be any other conductive metal such as a molymanganese-gold combination, is next deposited over dielectric layers 12 and 12*a* and window 25*a* through layer 12*a*. Metal 13 makes ohmic contact with a portion of the top surface of region 6 diffused in chip 11. It should be noted that hereafter chip 11 together with any overlying layers of dielectric materials or conductors, will be referred to as wafer 10.

As shown in FIG. 1*a*, conductor 13 terminates just to the right of window 25*a* in dielectric layer 12*a*. The end of conductor 13, denoted by number 24*a*, has a sharp edge. Consequently, overlying dielectric layer 14 likewise has a sharp edge 24*b* adjacent edge 24*a*. Next, a second layer of metallization, layer 15, is evaporated over the top surface of dielectric layer 14. Metal 15 likewise has a sharp edge 24*c* caused by the sharp edge 24*a* of metal conductor 13. As shown by FIG. 1*b*, edge 24*c* of metal layer 15 often crazes or cracks with the result that conductor 15 open circuits. This often destroys a device.

FIG. 1*a* illustrates a third dielectric layer, layer 16, overlying metal layer 15. Placed on top of layer 16 is a third layer metal conductor, conductor 17. As shown in FIG. 1*a*, conductor 17 is intended to be perpendicular to conductor 15 but in a plane parallel to the plane occupied by conductor 15. Conductor 17 likewise has sharp edges, which cause corresponding sharp edges in overlying insulation layer 18. These edges, labeled 22*a* and 22*b* in FIG. 1*a*, will possibly cause cracks in any fourth-layer conductor which must pass over conductor 17.

FIGS. 2*a* through 2*e* illustrate the prior art process by which not only conductor 17, but also conductors 13 and 15, are produced from an evaporated layer of metal. FIGS. 2*a* through 2*e* show just a small section of the portion of wafer 10 shown in FIGS. 1*a* and 1*b*. This section includes a portion of dielectric layer 16, and metal layer 17. Shown in FIGS. 2*a* through 2*e* on top of metal layer 17 is a layer 23 of masking material, typically KMER photoresist although other materials, such as AZ 1350H photoresist, can also be used if desired. Those portions of photoresist layer 23 overlying portions of evaporated metal layer 17 to be etched away are removed using well-known photolithographic techniques. Consequently, photoresist 23 remains only over those portions of metal 17 which are to form the third layer conductors on the wafer 10 shown in FIGS. 1*a* and 1*b*.

Next, an etchant is brought into contact with the exposed surface of metal layer 17. The etchant is carefully selected not to undercut and lift masking material 23. Consequently, the etchant eats away exposed portions of metal layer 17 but leaves substantially untouched those portions of metal layer 17 lying under masking material 23. Of course, there is some lateral etching by the etchant of those portions of metal layer 17 underlying masking material 23. But because the width of the conductor is an order of magnitude or so greater than the thickness of the conductor, this lateral etching has substantially no effect on the ultimate size of the conductor. More importantly, etchant is unable to penetrate the interface between masking material 23 and the underlying metal 17. Consequently, the sides of conductor 17 remain substantially vertical and edges 17*a* and 17*b* of conductor 17 shown, for example, in FIG. 2*e*, remain sharp and in contact with overlying layer of masking material 23. The result is that when dielectric layer 18 (FIG. 1*a*) is deposited over conductor 17, edges 22*a* and 22*b* of dielectric layer 18 are likewise sharp. Any metal layer deposited over these edges will most likely exhibit cracks and breaks at these edges.

Figure 3A:
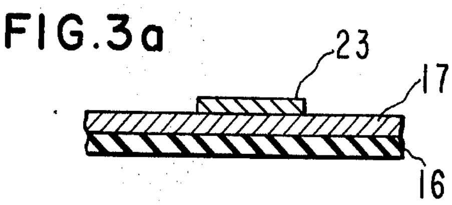
FIGS. 3*a* through 3*e* illustrate the etching process of this invention for producing the sloped and rounded conductors of this invention.
Figure 3B:
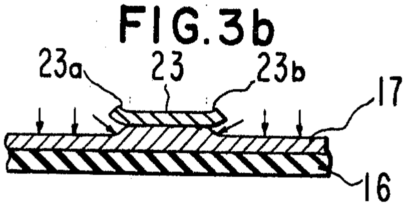
Figure 3C:
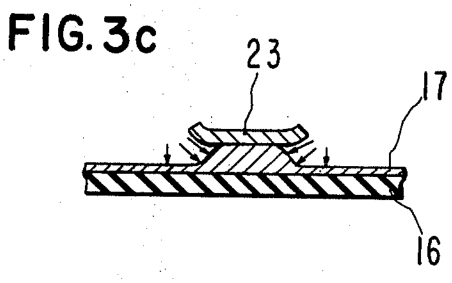
Figure 3D:
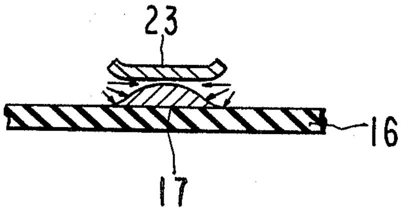

The process of this invention is illustrated by FIGS. 3*a* through 3*e*. FIG. 3*a* illustrates the identical structure shown in FIG. 2*b* with mask 23 again defining the conductive pattern to be formed from metal layer 17. The structure shown in FIG. 3*a* is brought into contact with an etchant. The etchant is carefully selected not only to remove the exposed portions of metal layer 17, but also to undercut and penetrate the interface between overlying layer of masking material 23 and the underlying metal conductor 17. Consequently, as shown in FIG. 3*b*, masking material 23 lifts at edges 23*a* and 23*b*. The etchant thus attacks the underlying metal 17 not only in a direction perpendicular to the plane of metal layer 17, but also in a direction parallel to this plane. The exposing of the top surface of metal layer 17 underlying masking material 23 results in the sides, the top surface, and in particular, the edges 17*a* and 17*b* (FIG. 2*e*) of metal 17 being etched away. As the process continues, etchant continues to destroy the bond between masking material 23 and underlying metal layer 17 until finally, at the completion of the etching, the sharp edges normally present in the remaining portions of conductive metal 17 have been completely removed. This process is illustrated in FIGS. 3*b* through 3*d*. The resulting conductor has, in one embodiment, a cross section substantially rounded as represented by conductor 17 in FIG. 3*e*.

Figure 3E:
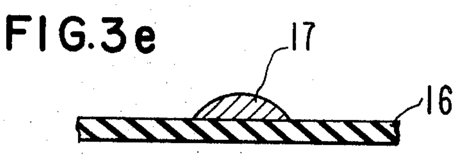

When the metal conductors are aluminum, or an aluminum-silicon compound containing no more than 2 percent silicon, the etchant used to produce the structure shown in FIG. 3*e* comprises, in one embodiment, 20 percent concentrated acetic acid, 20 percent concentrated nitric acid, and 60 percent concentrated phosphoric acid, all percentages being by volume. The etchant is heated to a given temperature, typically around 85° C. plus or minus 15° C. The etching process continues for a selected time period, typically around 1 to 2 minutes until the exposed portions of metal layer 17 (FIG. 3*a*) have been completely removed.

Completion of etching is determined by visual observation. The wafer is taken out of the etching solution, and observed. A darkening of the surface means that the unmasked metal has been removed and that the oxide underlying this metal is visible. Upon complete removal of the unmasked metal, the exposed surface appears dark. No perceptible etching of the oxide occurs.

A typical process for depositing two layers of metallization is as follows. The numbers in this description refer to FIG. 4*b*. The first layer 13 of aluminum is evaporated over oxide layer 12 on substrate 11. This aluminum, being in contact with silicon from oxide layer 12 and substrate 11, will contain a small percentage of silicon. The substrate may or may not be heated although heating generally insures a more uniform, better quality aluminum layer. Aluminum layer 13 is masked with KMER, a well-known photoresist consisting of low molecular weight polyisoprenes plus aromatic diazido compounds dissolved in xylene. See pages 445 to 451 of the book by Berry, Hall and Harris entitled "Thin Film Technology" published by D. Van Nostrand Company, Inc. 1968. The unmasked portions of aluminum 13 are removed by the special etch solution of this invention which also lifts the conductive-pattern defining masking material thereby rounding all edges and sloping all sides of the remaining conductors. This etch is at 85° C. and consists of 20 percent by volume concentrated acetic acid, 20 percent by volume concentrated nitric acid, and 60 percent by volume concentrated phosphoric acid. Upon completion of the etching, any remaining mask is removed. Then an oxide layer 14, containing a selected amount of phosphorus, is grown over the first layer aluminum 13 and the exposed oxide layer 12. Typically, this second dielectric layer 14 is about 0.5 microns thick. Next, dielectric layer 14 is masked and contact holes are etched through this dielectric to selected ones of underlying aluminum conductors 13. Then a selected thickness of a second aluminum layer, such as layer 15 (FIG. 4*b*) is deposited onto dielectric layer 14. For this deposition, the substrate is heated to about 350° C. Layer 15 is about 1 micron thick. Masking of this second aluminum layer to define the conductive pattern to be formed by this layer is followed by an etch using either the same solution as was used to etch the first aluminum layer or a standard etch solution if there is no need to slope the sides and round the edges of these conductors. Upon completion of the etching, the wafer 10 is rinsed in de-ionized water and sintered at 420° C. for 10 minutes. Sintering ensures good electrical contact between the two aluminum layers and is also used to place a thin gold layer on the backside of the wafer for use in attaching each die to a support.

No satisfactory theory explaining the operation of the special etch of this invention has as yet been developed. It is believed, however, that a competing reaction exists between nitric and phosphoric acid in the etch solution. Nitric acid is an oxidizing agent. Phosphoric acid is a reducing agent. It is believed that the nitric acid actually travels by capillary action along the interface between the aluminum layer and the overlying conductive-pattern-defining resist. The nitric acid breaks whatever bond exists between the overlying resist and the underlying aluminum. The acetic acid inhibits the nitric acid reaction but does not inhibit the phosphoric acid reaction. Consequently, the nitric acid lifts the resist, and then the phosphoric acid etches the exposed aluminum thereby sloping the sides and rounding off the edges of the conductor being etched. The acetic acid slows the rate of lifting of the photoresist.

Tables I, II, III, and IV give the effects of various mixtures of phosphoric, nitric and acetic acid, all concentrated, as a function of temperature, on the angles made by the sides of an aluminum conductor with the horizontal plane as well as describe the appearance of the edges of the intersections of these sides with the top of the aluminum conductor. The sides of the conductors are essentially those sides of conductor 17 shown in FIG. 2*e* which rise from insulating layer 16 to contact photoresist layer 23 in this figure. Analysis of the tables shows that, in general, as the percentage of nitric acid in the etch solution goes down, the temperature at which sloping of the sides and rounding of the edges occurs, goes up. But as the temperature goes up, speed of the etching reaction goes up. Consequently, experience has shown that an operator usually cannot accurately time the process when the temperature of the etchant is above 100° C.

Figure 4A:
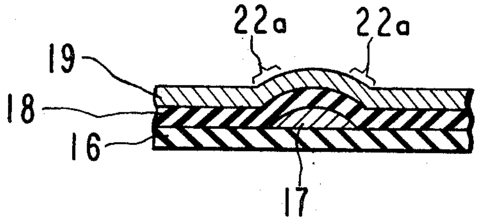
FIGS. 4*a* and 4*b* illustrate the rounded transitions over underlying conductors produced by the process and structure of this invention.
Figure 4B:
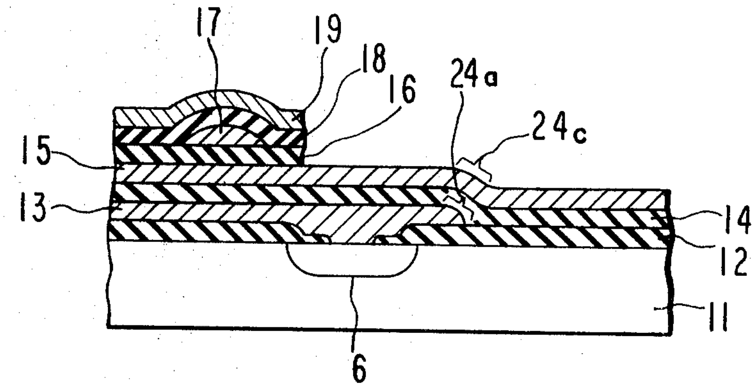

FIGS. 4*a* and 4*b* show structure substantially similar to that of FIG. 1*a*, with the exception that the metal conductors 13, 15, 17 and the additional conductor 19, shown in both FIGS. 4*a* and 4*b*, have all been etched by the process of this invention. The edge **24*a* of conductor 13 is rounded by the process of this invention with the result that the edge 24*c* of conductor 15 overlying the terminal portion of conductor 13 is also rounded. As a result, this edge does not exhibit the cracks commonly observed at this point in a multiple layer metal pattern. Likewise, the cross section of conductive layer 17 is rounded with the result that overlying metal layer 19 rises gradually over and across layer 17**.

While this invention has been described in connection with a semiconductor device containing two, three or four metal layers, this invention can, of course, be used to produce semiconductor devices containing any desired number of metal layers.

We claim:

1. A semiconductor die comprising a plurality of layers of conductive leads, intervening dielectric layers separating each layer of conductive leads from adjacent layers of leads and a first dielectric layer separating the bottom layer of conductive leads from the underlying semiconductor material of said die, said conductive layers selectively contacting adjacent conductive layers through holes in the intervening dielectric layers, and said bottom layer of conductive leads selectively contacting regions in the underlying substrate through windows in the intervening dielectric layer, each lead in a selected number of said plurality of layers of conductive leads having sloped sides and rounded edges, leads passing over underlying leads in said selected number of said plurality of layers making gradual transitions over said underlying leads.

2. Structure as in claim 1 in which said semiconductor die comprises two layers of conductive leads and said selected number is two.

TABLE I

| Temperature, ° C. | Concentration (percent volume) | Remarks: Angle of sides with horizontal | Remarks: Edge at intersection of side and top |
|---|---|---|---|
| 60 | 60% phosphoric; 20% nitric; 20% acetic | About 45° | Sharp. |
| 65 | do | About 30° | Do. |
| 70 | do | do | Rounding begins. |
| 80 | do | About 30° or less | Well-rounded. |
| 90 | do | Less than 30° | Completely rounded. |
| 100 | do | Increases toward 30° | Discernible but still rounded. |
| 105 | do | do | Do. |
| 110 | do | About 30° | Sharp. |

TABLE II

| Temperature, ° C. | Concentration (percent volume) | Remarks: Angle of sides with horizontal | Remarks: Edge at intersection of side and top |
|---|---|---|---|
| 50 | 70% phosphoric; 15% nitric; 15% acetic | About 70° | Sharp. |
| 60 | do | do | Do. |
| 70 | do | About 30° | Begins to round. |
| 80 | do | do | Rounding increases. |
| 90 | do | Slightly steeper than 30° | Very well rounded. |
| 100 | do | do | Top of edge still rounded but sharpness appears near bottom of edge. |
| 110 | do | Between 30° and 45° | Sharp. |

TABLE III

| Temperature, ° C. | Concentration (percent volume) | Remarks |
|---|---|---|
| 70, 80 and 90 | 80% phosphoric; 10% nitric; 10% acetic | At 70° C. and 80° C. sides made an angle of about 60° with horizontal. At 90° C. side angle was lower than at lower temperatures. At all three temperatures. edges at intersections of sides with top were sharp. |
| Do | 90% phosphoric; 5% nitric: 5% acetic | At these three temperatures sides were all almost vertical (making angle of about 85° with horizontal) and edges at intersections of sides with tops were sharp. |

TABLE IV

| Temperature | Concentration (percent volume) | Remarks |
|---|---|---|
| All temperatures | 60% phosphoric; 30% nitric; 10% acetic | Get sloped sides with well rounded edges. |
| Do | 60% phosphoric; 10% nitric; 30% acetic | Get severe and nonuniform lifting of masking material at all temperatures. |
| Do | 40% phosphoric; 40% nitric; 20% acetic | Results unusable. |

3. Structure as in claim 1 in which said semiconductor die comprises three layers of conductive leads and said selected number is three.

4. Structure as in claim 1 in which said semiconductor die comprises silicon.

5. Structure as in claim 4 in which said plurality of layers of conductive leads comprise a plurality of layers of aluminum leads.

6. The method of producing on a wafer a layer of conductive leads, each lead having sloping sides and rounded edges, comprising:

depositing a layer of metal over a dielectric layer on said wafer, said layer of metal adhering to said dielectric layer;

masking said layer of metal to define the conductive pattern of said leads while leaving unmasked the other portions of said layer of metal;

submerging said wafer in an etching solution for removing the unmasked portions of said layer of metal and for removing the mask defining the conductive pattern at a selected rate, thereby to etch the metal exposed while lifting said conductive-pattern-defining mask material from said metal layer and thus sloping the sides and rounding the edges of the conductive leads; and, removing said wafer containing said etched metal layer from said solution after the unmasked metal has been removed by the etchant.

7. The method as in claim 6 wherein said metal layer is aluminum.

8. The method as in claim 7 wherein said etchant is a mixture of phosphoric, nitric and acetic acids heated to a selected temperature.

9. The method of claim 8 wherein said mixture of acids is heated to between 60° and 110° C.

10. The method of claim 8 wherein said mixture of acids is heated to a temperature between 70° and 100° C.

11. The method of claim 10 wherein said phosphoric acid comprises between about 55 to 75 percent by volume concentrated phosphoric acid, with the remaining percentage by volume being approximately equally divided between nitric and acetic acid, both concentrated.

12. The method of claim 10 wherein said phosphoric acid comprises between about 55 to 75 percent by volume of said etchant, said nitric acid comprises between 15 to 30 percent by volume of said etchant, and said acetic acid comprises the remainder of said etchant, all said acids being concentrated.

13. The method as in claim 10 wherein said phosphoric acid comprises about 60 percent by volume of said etchant, said nitric acid comprises between 15 to 30 percent by volume of said etchant, and said acetic acid comprises the remainder of said etchant.

14. A semiconductor die comprising a plurality of layers of conductive leads, intervening dielectric layers separating each layer of conductive leads being from adjacent layers of conductive leads and a first dielectric layer composed of one or more dielectric materials separating the bottom layer of conductive leads from the underlying semiconductor material, leads in said conductive layers selectively contacting leads in adjacent conductive layers through holes in the intervening dielectric layers, and said bottom layer of conductive layers of conductive leads selectively contacting regions in the underlying semiconductor material through windows in said first dielectric layer, each lead in each conductive layer, below the top conductive layer, having sloping sides and rounded edges, and leads passing over underlying leads making gradual transitions over said underlying leads.

15. A semiconductor device comprising a semiconductor chip containing a plurality of layers of conductive leads separated from each other and the semiconductor chip by electrically insulating materials, said device characterized in that:

the conductive leads in a selected number of said plurality of layers of conductive leads have sloped sides and rounded edges.

16. Structure as in claim 15 wherein the conductive leads in all said plurality of layers of conductive leads have sloped sides and rounded edges.

17. In a semiconductor device comprising a semiconductor chip containing a plurality of layers of conductive leads separated from each other and the semiconductor chip by electrically insulating materials, the improvement comprising:

the conductive leads in a selected number of said plurality of layers of conductive leads having sloped sides.

18. Structure as in claim 17 wherein the conductive lead in all said plurality of layers of conductive leads have sloped sides.

19. Structure as in claim 17 wherein the sides of the conductive leads in said selected number of said plurality of layers of conductive leads form an angle of 70° or less with the top surface of said semiconductor chip.

20. The structure of claim 17 wherein the sides of said conductive leads in said selected number of said plurality of layers of conductive leads form an angle of 45° or less with the top surface of said semiconductor chip.

21. Structure as in claims 17 wherein the sides of the conductive leads in said selected number of said plurality of layers of conductive leads form angles of about 30° with the top surface of said chip.

22. Structure as in claim 1 wherein the sloped sides of the conductive leads in said selected number of said plurality of layers of conductive leads form an angle of 70° or less with the top surface of said semiconductor die.

23. The structure of claim 1 wherein the sloped sides of the conductive leads in said selected number of said plurality of layers of conductive leads form an angle of 45° or less with the top surface of said semiconductor die.

24. Structure as in claims 1 wherein the sloped sides of the conductive leads in said selected number of said plurality of layers of conductive leads form angles of about 30° with the top surface of said semiconductor die.

UNITED STATES PATENT OFFICE

CERTIFICATE OF CORRECTION

Patent No. 3,586,922 Dated June 22, 1971

Inventor(s) Larry R. Johnson et al.

It is certified that error appears in the above-identified patent and that said Letters Patent are hereby corrected as shown below:

Column 7, line 54, cancel "being". Column 8, line 5, cancel "of conductive layers"; line 29, "lead" should read -- leads --.

Signed and sealed this 30th day of May 1972.

(SEAL)
Attest:

EDWARD M.FLETCHER,JR.
Attesting Officer

ROBERT GOTTSCHALK
Commissioner of Patents